United States Patent
Yao et al.

(10) Patent No.: US 9,897,859 B2
(45) Date of Patent: *Feb. 20, 2018

(54) LIQUID CRYSTAL DISPLAY PANEL AND FABRICATION METHOD

(71) Applicants: Xiamen Tianma Micro-electronics Co., Ltd., Xiamen (CN); Tianma Micro-electronics Co., Ltd., Shenzhen (CN)

(72) Inventors: Shulin Yao, Xiamen (CN); Long Zhang, Xiamen (CN); Ting Zhou, Xiamen (CN); Poping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

(*) Notice: Subject to any disclaimer, the term of this patent is extended or adjusted under 35 U.S.C. 154(b) by 132 days.

This patent is subject to a terminal disclaimer.

(21) Appl. No.: 14/992,242

(22) Filed: Jan. 11, 2016

(65) Prior Publication Data

US 2016/0238898 A1    Aug. 18, 2016

(30) Foreign Application Priority Data

Feb. 13, 2015    (CN) .......................... 2015 1 0078151

(51) Int. Cl.
*G02F 1/1343*    (2006.01)
*G02F 1/1335*    (2006.01)
*G02F 1/1337*    (2006.01)

(52) U.S. Cl.
CPC .. *G02F 1/133753* (2013.01); *G02F 1/133528* (2013.01); *G02F 1/134309* (2013.01);
(Continued)

(58) Field of Classification Search
CPC ... G02F 1/133528; G02F 2001/133538; G02F 1/133707; G02F 1/134309;
(Continued)

(56) References Cited

U.S. PATENT DOCUMENTS

2015/0015817 A1    1/2015  Okazaki
2016/0238886 A1*   8/2016  Yao .................... G02F 1/133528
(Continued)

FOREIGN PATENT DOCUMENTS

CN    102388337 A    3/2012
CN    102914928 A    2/2013
(Continued)

*Primary Examiner* — Huyen Ngo
(74) *Attorney, Agent, or Firm* — Anova Law Group, PLLC

(57) ABSTRACT

The present disclosure provides a LCD panel. The LCD panel includes a first substrate, a second substrate, a liquid crystal layer sandwiched between the first substrate and the second substrate, a plurality of regions arranged in an array including a first region and a second region, a first organic film on the first substrate, and a second organic film on the second substrate. In the first region, at least one stripe-shaped first electrode is formed having a first configuration direction, the first organic film has a polarization direction in a first direction and the second organic film has a polarization direction perpendicular to the first direction. In the second region, at least one stripe-shaped second electrode is formed having a second configuration direction, the first organic film has a polarization direction in a second direction and the second organic film has a polarization direction perpendicular to the second direction.

19 Claims, 14 Drawing Sheets

(52) U.S. Cl.
CPC .. *G02F 1/133788* (2013.01); *G02F 1/134363* (2013.01); *G02F 2001/133538* (2013.01); *G02F 2001/133757* (2013.01); *G02F 2001/134372* (2013.01)

(58) Field of Classification Search
CPC ....... G02F 2001/133531; G02F 1/1333; G02F 1/133753; G02F 1/133788; G02F 2001/133357; G02F 2001/133757; G02F 2201/40; G02B 5/305
See application file for complete search history.

(56) References Cited

U.S. PATENT DOCUMENTS

2016/0238887 A1* 8/2016 Yao .................... G02F 1/133528
2016/0238888 A1* 8/2016 Yao .................... G02F 1/133528

FOREIGN PATENT DOCUMENTS

| CN | 103018965 A | 4/2013 |
| CN | 103309093 A | 9/2013 |
| CN | 103645590 A | 3/2014 |

\* cited by examiner

LIQUID CRYSTAL DISPLAY PANEL AND FABRICATION METHOD

CROSS-REFERENCES TO RELATED APPLICATIONS

This application claims the priority of Chinese Patent Application No. CN201510078151.3, filed on Feb. 13, 2015, the entire contents of which are incorporated herein by reference.

FIELD OF THE DISCLOSURE

The present disclosure generally relates to the field of display technologies and, more particularly, relates to a liquid crystal display panel and a fabrication method thereof.

BACKGROUND

Liquid crystal display (LCD) panels have the advantages of light weight, low thickness, and low power consumption. LCD panels are widely used in television sets, mobile phones, monitors, and other electronic devices.

Twisted nematic LCD panels are widely used due to the simple fabrication process. However, the twisted nematic LCD panels have narrow viewing angles. To overcome the narrow viewing angle limitation, in-plane electric field driven LCD panels having wide viewing angles and other desirable performances have been developed. However, in-plane electric field driven LCD panels have color shift problem and the performance still needs improvements.

The disclosed liquid crystal display panel and fabrication method are directed to solve one or more problems set forth above and other problems in the art.

BRIEF SUMMARY OF THE DISCLOSURE

Directed to solve one or more problems set forth above and other problems in the art, the present disclosure provides a liquid crystal display panel and fabrication method to improve image viewing experience.

One aspect of the present disclosure includes a liquid crystal display (LCD) panel. The LCD panel includes a first substrate, a second substrate arranged opposite to the first substrate, a liquid crystal layer sandwiched between the first substrate and the second substrate, a plurality of regions arranged in an array, including at least a first region and a second region adjacent to the first region, wherein the first region includes at least one stripe-shaped first electrode having a first configuration direction and the second region includes at least one stripe-shaped second electrode having a second configuration direction different from the first configuration direction, a first organic film formed on the first substrate, and a second organic film formed on the second substrate. The first organic film and the second organic film have mutually perpendicular polarization directions. In the first region, the first organic film has a polarization direction in a first direction and the second organic film has a polarization direction perpendicular to the first direction. In the second region, the first organic film has a polarization direction in a second direction and the second organic film has a polarization direction perpendicular to the second direction.

Another aspect of the present disclosure provides a liquid crystal display device. The LCD device includes a liquid crystal display panel according to the present disclosure.

Another aspect of the present disclosure provides a method of fabricating the liquid crystal display panel. The fabrication method includes the following steps. A first substrate is provided. A second substrate arranged opposite to the first substrate is provided. A plurality of regions arranged in an array is formed including at least a first region and a second region adjacent to the first region on the first and second substrates. A first organic film is formed on the first substrate. A second organic film on the second substrate. A first alignment layer on the first substrate. At least one stripe-shaped first electrode is formed in the first region of the second substrate and at least one stripe-shaped second electrode is formed in the second region of the second substrate. A second alignment layer is formed on the stripe-shaped first and second electrodes. A liquid crystal layer is formed on the first alignment layer side of the first substrate or on the second alignment layer side of the second substrate. The first substrate and the second substrate are bonded together with the first alignment layer and the second alignment layer facing toward each other to form a liquid crystal display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
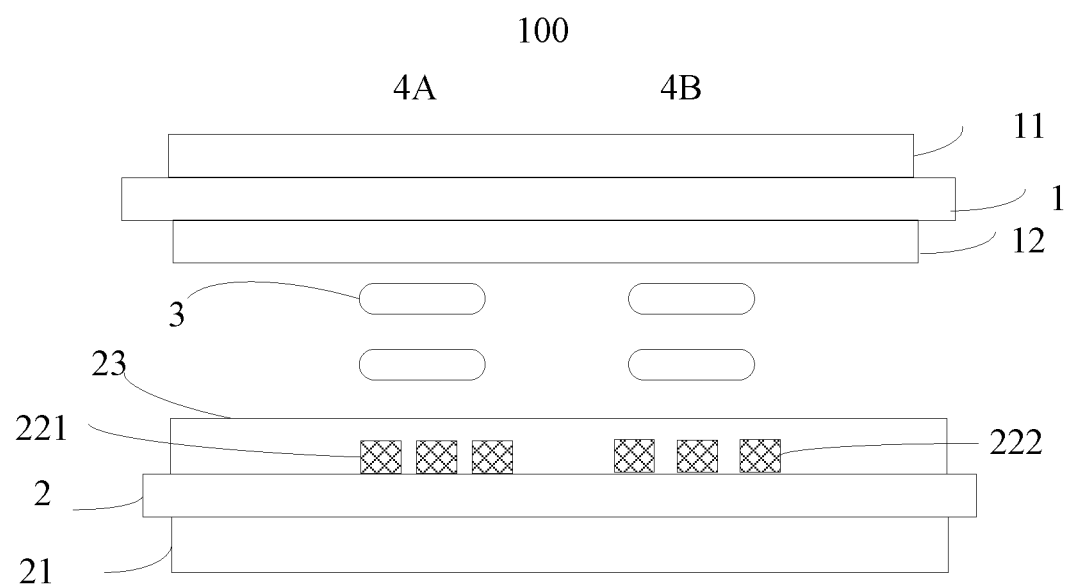
FIG. 1 illustrates a schematic view of an exemplary liquid crystal display panel according to the disclosed embodiments.

FIG. 1 illustrates a schematic view of an exemplary liquid crystal display panel according to the present disclosure. Referring to FIG. 1, the present disclosure provides a liquid crystal display (LCD) panel 100. The LCD panel 100 may include a first substrate 1, a second substrate 2 disposed opposite to the first substrate, and a liquid crystal layer 3 disposed between the first substrate 1 and the second substrate 2. The LCD panel 100 may have a plurality of regions arranged in an array. The plurality of regions may include a first region 4A and a second region 4B. The first region 4A may include at least one stripe-shaped first electrode 221. The second region 4B may include at least one stripe-shaped second electrode 222.

The LCD panel 100 may further include a first alignment layer 12 disposed on the surface of the first substrate 1 between the first substrate 1 and the liquid crystal layer 3, and a second alignment layer 23 on the surface of the second substrate 2 between the second substrate 2 and the liquid crystal layer 3. The first alignment layer 12 and the second alignment layer 23 may have the same alignment direction. In a power-off state, the liquid crystal molecules in the liquid crystal layer 3 may have an initial alignment direction same as the alignment direction of the first alignment layer 12 and the second alignment layer 23.

Figure 2:
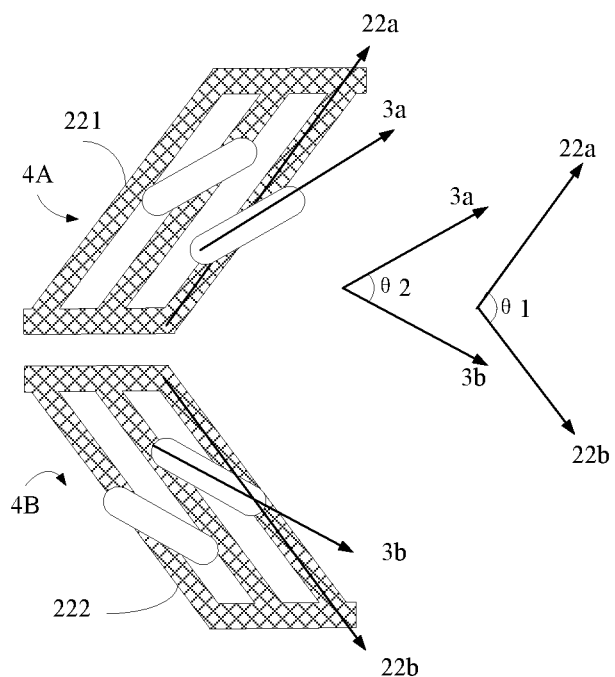
FIG. 2 illustrates a schematic view of the relationship between the stripe-shaped electrodes and the initial alignment directions of the liquid crystal molecules according to the disclosed embodiments.

FIG. 2 illustrates a schematic view of the relationship between the stripe-shaped electrodes and the initial alignment directions of the liquid crystal molecules according to the present disclosure. Referring to FIG. 2, in the first region 4A, the first alignment layer 12 and the second alignment layer 23 may have a first direction 3a as the alignment direction. In the second region 4B, the first alignment layer 12 and the second alignment layer 23 may have a second direction 3b as the alignment direction. The first direction 3a and the second direction 3b may form a second angle θ2.

Further, the stripe-shaped first electrode 221 may have a first configuration direction 22a and the stripe-shaped second electrode 222 may have a second configuration direction 22b. The first configuration direction 22a and the second configuration direction 22b may form a first angle θ1. The second angle θ2 may be smaller than the first angle θ1. The LCD panel 100 according to the present disclosure may have a dual-domain structure. The dual-domain structure may have a first domain corresponding to the first region 4A and a second domain corresponding to the second region 4B. The first region 4A and the second region 4B region may have different electrode configuration directions and different alignment directions in the alignment layers. As a result, each domain may provide a different viewing angle. When the two different viewing angles are combined, the dual-domain structure may provide a wider viewing angle than the viewing angle of a single domain structure. Thus, the LCD panel 100 with a dual-domain structure may provide a wide viewing angle.

In one embodiment, the first alignment layer 12 and the second alignment layer 23 may be made of an optical-alignment material.

Figure 3A:
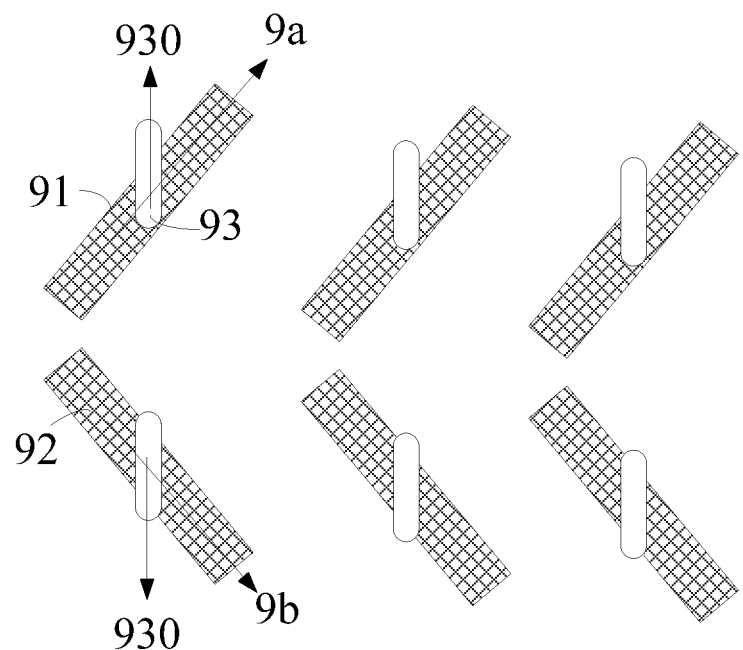
FIG. 3a illustrates a schematic view of the relationship between a stripe-shaped electrode orientation and an initial alignment direction of the liquid crystal molecules in a conventional LCD panel.

The display effect of the LCD panel 100 according to the present disclosure is described in the followings with the comparison to the display effect of the existing LCD panels. FIG. 3a illustrates a schematic view of the relationship between a stripe-shaped electrode orientation and an initial alignment direction of the liquid crystal molecules in a conventional LCD panel.

Referring to FIG. 3a, the dual-domain LCD panel 100 may include a plurality of stripe-shaped first electrodes 91 and a plurality of stripe-shaped second electrodes 92 disposed adjacent to the plurality of stripe-shaped first electrodes 91. The stripe-shaped first electrodes 91 may belong to a first domain and the stripe-shaped second electrodes 92 may belong to a second domain. The stripe-shaped first electrodes 91 may have a first configuration direction 9a and the second stripe-shaped electrodes 92 may have a second configuration direction 9b.

In the first and second domains, liquid crystal molecules 93 may have the same initial alignment direction 930 with respective to the configuration directions of the stripe-shaped electrodes. Each pair of a stripe-shaped first electrode 91 and a stripe-shaped second electrode 92 may form a repetition unit. A plurality of such repetition units may be arranged in an array. In the current manufacturing process, because the alignment process applied to the alignment layer is the same for different regions of the LCD panel and the entire alignment layer is formed in a single step, different regions of the same alignment layer may have the same alignment direction. Thus, the liquid crystal molecules 93 disposed on the same alignment layer may be arranged in an array with the same initial alignment direction.

Due to the anisotropic characteristics of the liquid crystal molecules 93, different optical characteristics may be observed from different angles. In each repetition unit, liquid crystal molecules 93 may have the same initial alignment direction 930. In the same gray scale, different colors of a LCD panel may be observed from different viewing angles. Such color shift may cause undesirable display effect. The color shift may be more severe particularly in low gray scales, wherein low gray scales correspond to small rotation angles of the liquid crystal molecules 93.

Figure 3B:
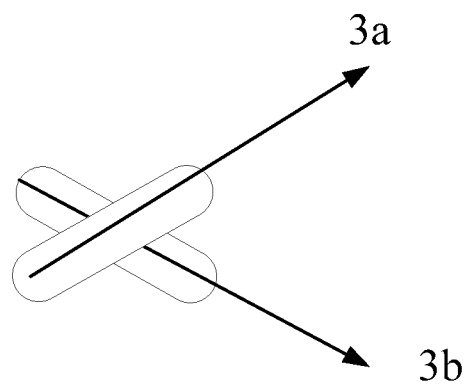
FIG. 3b illustrates a schematic view of the liquid crystal molecule initial alignment directions in a first region and a second region of an exemplary liquid crystal display panel according to the disclosed embodiments.

FIG. 3b illustrates a schematic view of the initial alignment directions of liquid crystal molecules in a first region and a second region of an exemplary liquid crystal display panel according to the present disclosure. The dual-domain LCD panel 100 according to the present disclosure may have the second angle θ2 smaller than the first angle θ1. Referring to FIG. 3b, the initial alignment direction 3a of liquid crystal molecules 93 in the first region 4A may be different from the initial alignment direction 3b of liquid crystal molecules 93 in the second region 4B. The liquid crystal molecules 93 in the first region 4A and the second region 4B may compensate with each other's optical characteristics. When observed from different viewing angles, the LCD panel 100 may have a more uniform display effect to mitigate the color shift problem.

In certain embodiments, the first angle θ1 may be equal to or less than 180°, and the second angle θ2 may be greater than 90°.

Referring back to FIG. 1, the LCD panel 100 may further include a first organic film 11 disposed on the side of the first alignment layer 12 away from the liquid crystal layer 3 and a second organic film 21 disposed on the side of the second alignment layer 23 away from the liquid crystal layer 3. The first organic film 11 and the second organic film 21 may be made of a base material and a dichroic organic dye. The first organic film 11 and the second organic film 21 may have mutual-perpendicular polarization directions.

The liquid crystal molecules 93 may rotate the polarization direction of the light. The LCD panel 100 may need a pair of polarizing layers with mutually perpendicular polarization directions to display images. The polarization direction of one polarizing layer may be perpendicular to the initial alignment direction of the liquid crystal molecules 93. The polarization direction of the other polarizing layer may be parallel with the initial alignment direction of the liquid crystal molecules 93.

Figure 4A:
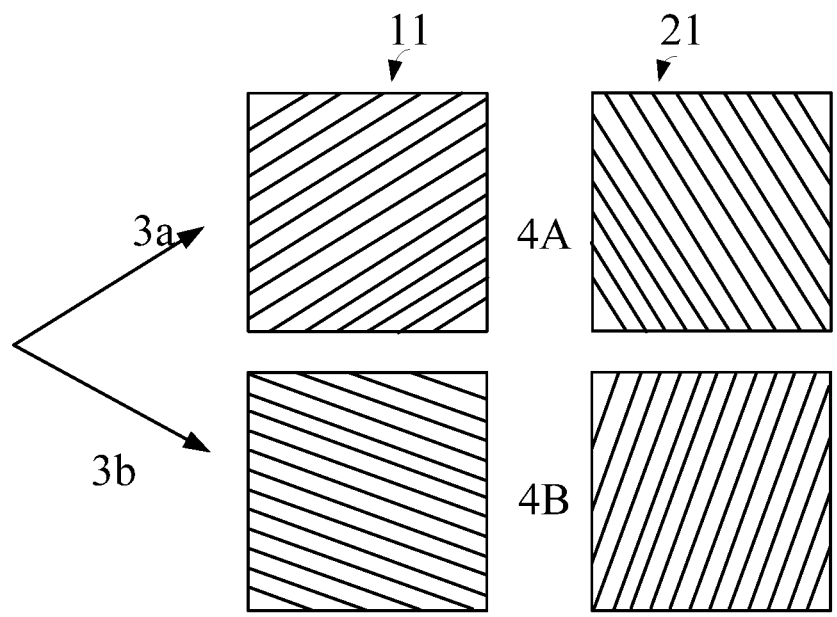
FIG. 4a illustrates a schematic view of polarization directions of a first organic film and a second organic film of an exemplary LCD panel according to the disclosed embodiments.

FIG. 4a illustrates a schematic view of polarization directions of a first organic film and a second organic film of an exemplary LCD panel according to the present disclosure. Referring to FIG. 4a, in one embodiment, the first organic film 11 may have a polarization direction parallel with the first direction 3a in the first region 4A. The second organic film 21 may have a polarization direction perpendicular to the first direction 3a in the first region 4A. The first organic film 11 may have a polarization direction parallel with the second direction 3b in the second region 4B. The second organic film 21 may have a polarization direction perpendicular to the second direction 3b in the second region 4B. The first organic film 11 and second organic film 21 may act like two polarizing layers. So two polarizing layers with mutually perpendicular polarization directions may be configured in the first region 4A and the second region 4B.

Figure 4B:
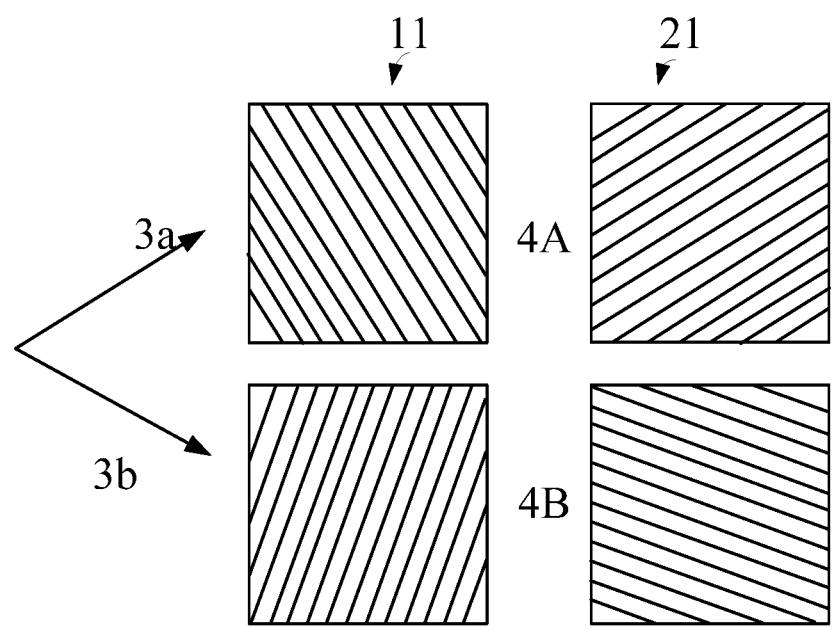
FIG. 4b illustrates a schematic view of polarization directions of a first organic film and a second organic film of another exemplary LCD panel according to the disclosed embodiments.

FIG. 4b illustrates a schematic view of polarization directions of a first organic film and a second organic film of another exemplary LCD panel according to the present disclosure. Referring to FIG. 4b, in another embodiment, the first organic film 11 may have a polarization direction perpendicular to the first direction 3a in the first region 4A. The second organic film 21 may have a polarization direction parallel with the first direction 3a in the first region 4A. The first organic film 11 may have a polarization direction perpendicular to the second direction 3b in the second region 4B. The second organic film 21 may have a polarization direction parallel with the second direction 3b in the second region 4B. The first organic film 11 and second organic film 21 may act like two polarizing layers. So two polarizing layers with mutually perpendicular polarization directions may be configured in the first region 4A and the second region 4B.

The first organic film 11 and the second organic film 21 may be made of a base material and a dichroic organic dye. The base material of the first organic film 11 and the second organic film 21 may be made of optical-alignment material or may be made of a non-optical-alignment material. Similarly, the dichroic organic dye of the first organic film 11 and the second organic film 21 may be made of optical-alignment material or may be made of a non-optical-alignment material. However, at least one of the base material and the dichroic organic dye may be made of optical-alignment material.

In one embodiment, the base material may be made of an optical-alignment material and the dichroic organic dye may be made of a non-optical-alignment material. When irradiated by a polarized ultra violet light, the molecules of the base material may be aligned in one direction based on the polarization direction of the polarized ultra violet light. At the same time, the base material may cause the dichroic organic dye to be aligned in a same direction. When the dichroic organic dye is aligned in a same direction, the polarizing organic film may be formed. When the first region 4A and the second region 4B of the first organic film 11 and the second organic film 21 are irradiated by polarized ultra violet lights with different polarization directions, the first organic film 11 and the second organic film 21 may have different polarization directions in different regions.

In another embodiment, the dichroic organic dye may be made of optical-alignment material and the base material may be made of a non-optical-alignment material. When irradiated by a polarized ultra violet light, the molecules of the dichroic organic dye may be aligned in one direction based on the polarization direction of the polarized ultra violet light. When the dichroic organic dye is aligned in a same direction, the polarizing organic film may be formed. The base material may simply be a desired film forming material. When the first region 4A and the second region 4B of the first organic film 11 and the second organic film 21 are irradiated by polarized ultra violet lights with different polarization directions, the first organic film 11 and the second organic film 21 may have different polarization directions in different regions.

The dichroic organic dye may include one or more of azo dye, anthraquinone dye, biphenyl dye, triphenylmethane diazinon and derivative dye, single methine or methines dye, and polyethylene ring dye.

Figure 5A:
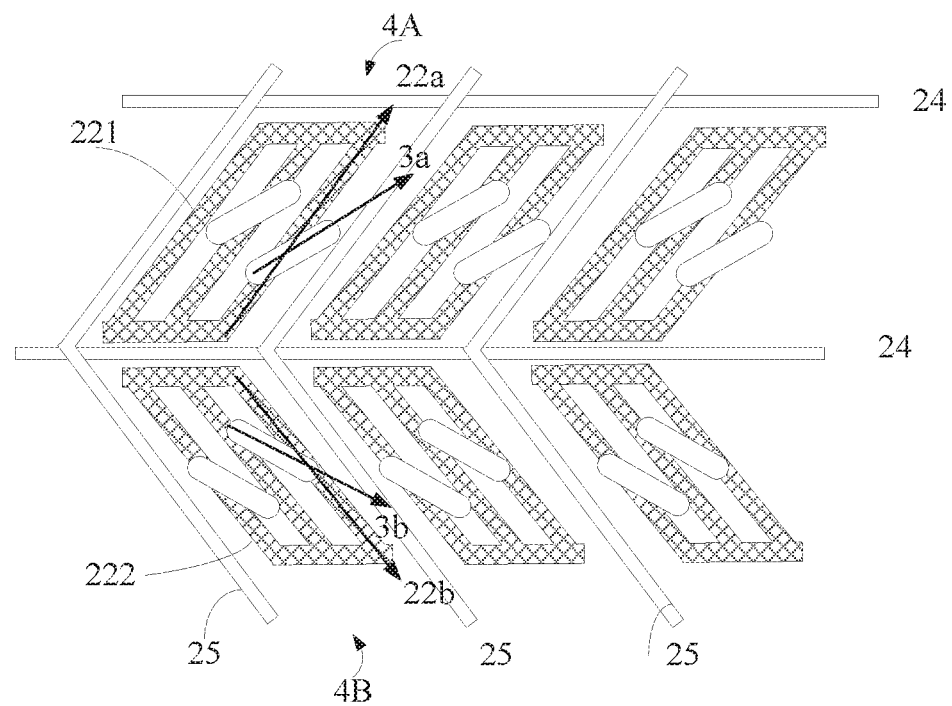
FIG. 5a illustrates a schematic view of a first region with first pixel units and a second region with second pixel units in an exemplary liquid crystal display panel according to the disclosed embodiments.

In one embodiment, the first region 4A may be a first pixel unit. The second region 4B may be a second pixel unit. The first pixel unit and the second pixel unit may be adjacent to each other. FIG. 5a illustrates a schematic view of a first region as a first pixel unit and a second region as a second pixel unit in an exemplary liquid crystal display panel according to the present disclosure.

Referring to FIG. 5a, the LCD panel 100 may further include a plurality of scan lines 24 and a plurality of data lines 25 intersected with and insulated from the plurality of scan lines 24. The plurality of scan lines 24 and the plurality of data lines 25 may be intersected to define a plurality of regions. The plurality of regions may include the first region 4A and the second region 4B. The first region 4A may be the first pixel unit. The second region 4B may be the second pixel unit. The first region 4A and the second region 4B may be configured separately in the first pixel unit and the second pixel unit that are adjacent to each other to provide display effect in two different domains.

Figure 5B:
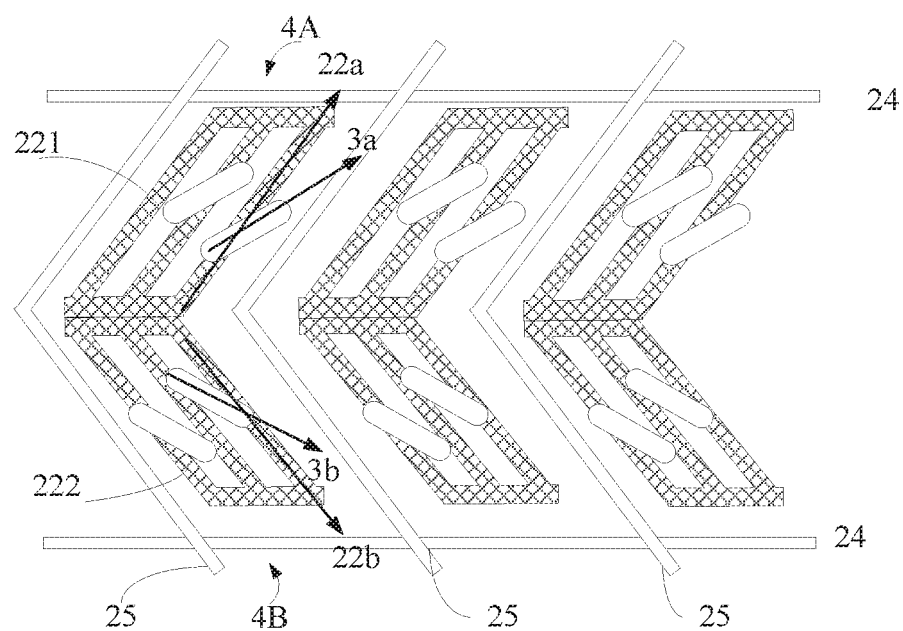
FIG. 5b illustrates a schematic view of a pixel unit containing a first region and a second region in an exemplary liquid crystal display panel according to the disclosed embodiments.

In another embodiment, a pixel unit may include a first region 4A and a second region 4B. A stripe-shaped first electrode and a stripe-shaped second electrode may be connected together in the pixel unit. FIG. 5b illustrates a schematic view of a pixel unit containing a first region and a second region in an exemplary liquid crystal display panel according to the disclosure.

Referring to FIG. 5b, the LCD panel 100 may further include a plurality of scan lines 24 and a plurality of data lines 25 intersected with and insulated from the plurality of scan lines 24. The plurality of scan lines 24 and the plurality of data lines 25 may be intersected to define a plurality of pixel units. Each pixel unit may include a first region 4A and a second region 4B. The stripe-shaped first electrode 221 and the stripe-shaped second electrode 222 may be connected together in the pixel unit. The first region 4A and the second region 4B may be configured in a same pixel unit to provide display effect in two different domains.

Figure 6A:
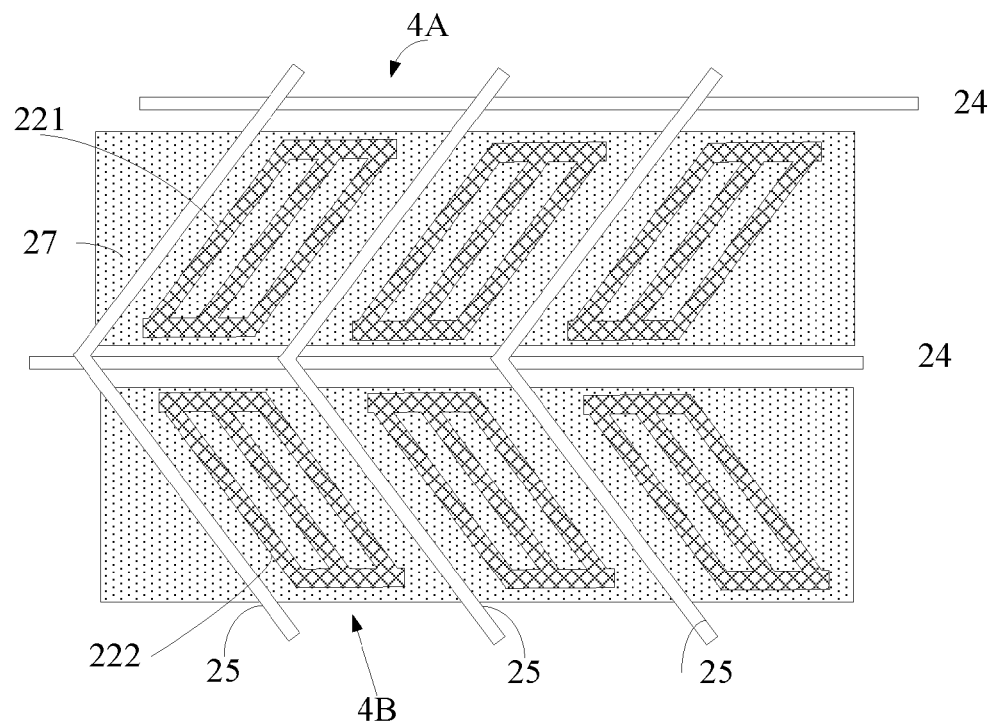
FIG. 6a illustrates a schematic view of stripe-shaped pixel electrodes according to the disclosed embodiments.

In one embodiment, the first region 4A may include a pixel electrode and a common electrode. The common electrode may be a plane shaped electrode. The pixel electrode may be a stripe-shaped first electrode. The second region 4B may include a pixel electrode and a common electrode. The common electrode may be a plane shaped electrode. The pixel electrode may be a stripe-shaped second electrode. FIG. 6a illustrates a schematic view of stripe-shaped pixel electrodes according to the present disclosure.

Referring to FIG. 6a, the LCD panel 100 may include a plurality of scan lines 24 and a plurality of data lines 25 intersected with and insulated from the plurality of scan lines 24. The plurality of scan lines 24 and the plurality of data lines 25 may be intersected to define a plurality of regions. The plurality of regions defined by the intersected scan lines 24 and data lines 25 may include the first region 4A and the second region 4B.

The first region 4A may include a pixel electrode 221 and a common electrode 27. The pixel electrode 221 may be a stripe-shaped first electrode. The common electrode 27 may be a plane shaped electrode. The pixel electrode 221 may be disposed above the common electrode 27. An insulating layer (not shown) may be formed between the pixel electrode 221 and the common electrode 27. The common electrodes in the plurality of first regions 4A may be connected together.

Similarly, the second region 4B may include a pixel electrode 222 and a common electrode 27. The pixel electrode 222 may be a stripe-shaped second electrode. The common electrode 27 may be a plane shaped electrode. The pixel electrode 222 may be disposed above the common electrode 27. An insulating layer (not shown) may be formed between the pixel electrode 222 and the common electrode 27. The common electrodes in the plurality of second regions 4B may be connected together.

Figure 6B:
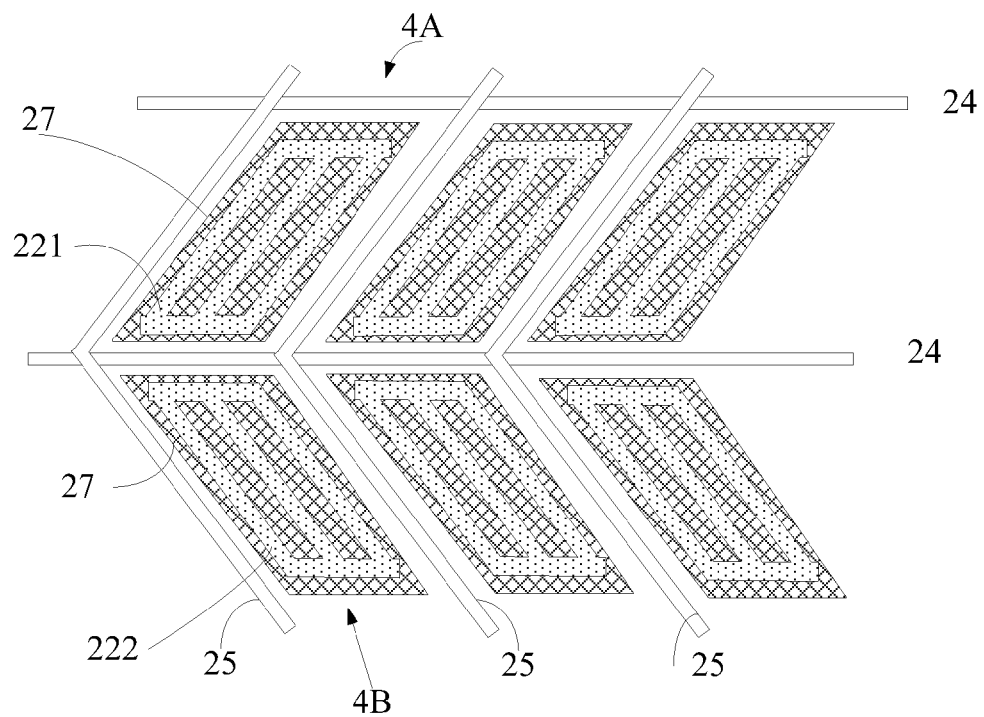
FIG. 6b illustrates a schematic view of stripe-shaped common electrodes according to the disclosed embodiments.

In another embodiment, the first region 4A may include a pixel electrode and a common electrode. The common electrode may be a stripe-shaped first electrode. The pixel electrode may be a plane shaped electrode. The second region 4B may include a pixel electrode and a common electrode. The common electrode may be a stripe-shaped second electrode. The pixel electrode may be a plane shaped electrode. FIG. 6b illustrates a schematic view of stripe-shaped common electrodes according to the present disclosure.

Referring to FIG. 6b, the LCD panel 100 may include a plurality of scan lines 24 and a plurality of data lines 25 intersected with and insulated from the plurality of scan lines 24. The plurality of scan lines 24 and the plurality of data lines 25 may be intersected to define a plurality of regions. The plurality of regions defined by the intersected scan lines 24 and data lines 25 may include the first region 4A and the second region 4B. The first region 4A may include a pixel electrode 27 and a common electrode 221. The pixel electrode 27 may be a plane shaped electrode. The common electrode 221 may be a stripe-shaped first electrode. The pixel electrode 27 may be disposed under the common electrode 221. An insulating layer (not shown) may be formed between the pixel electrode 27 and the common electrode 221.

Similarly, the second region 4B may include a pixel electrode 27 and a common electrode 222. The pixel electrode 27 may be a plane shaped electrode. The common electrode 222 may be a stripe-shaped second electrode. The pixel electrode 27 may be disposed under the common electrode 222. An insulating layer (not shown) may be formed between the pixel electrode 27 and the common electrode 222.

In another embodiment, the first region 4A may include a pixel electrode and a common electrode. Both the pixel electrode and the common electrode may be a stripe-shaped first electrode. The second region 4B may include a pixel electrode and a common electrode. Both the pixel electrode and the common electrode may be a stripe-shaped second electrode.

In certain embodiments, the first organic film may be disposed on the side of the first substrate away from the liquid crystal layer. The second organic film may be disposed on the side of the second substrate away from the liquid crystal layer. Returning to FIG. 1, the first organic film 11 may be disposed on the side of the first substrate 1 away from the liquid crystal layer 3. The second organic film 21 may be disposed on the side of the second substrate 2 away from the liquid crystal layer 3.

Figure 7:
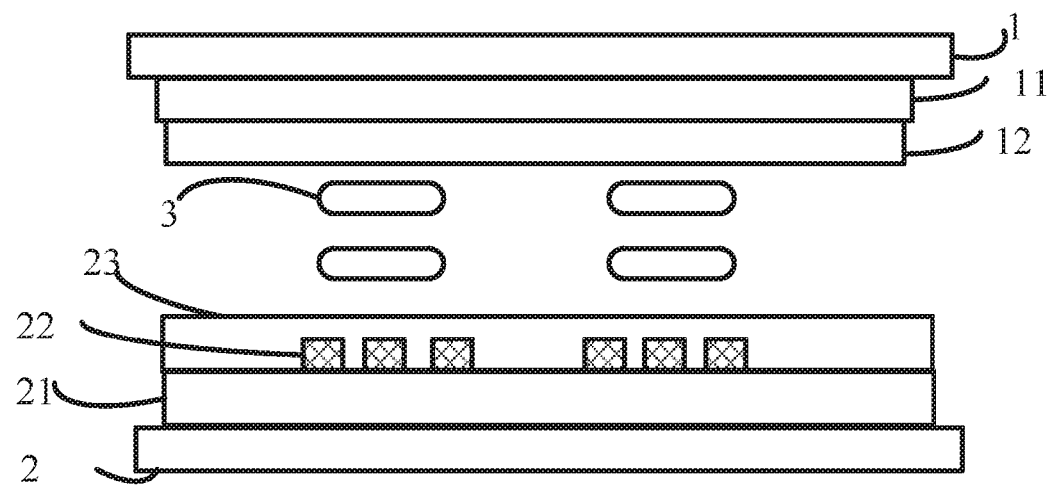
FIG. 7 illustrates a schematic view of the position of the first organic film and the second organic film in an exemplary liquid crystal display panel according to the disclosed embodiments.

In certain other embodiments, the first organic film may be disposed between the first alignment layer and the first substrate. The second organic film may be disposed between the second alignment layer and the second substrate. FIG. 7 illustrates a schematic view of the position of the first organic film and the second organic film in an exemplary liquid crystal display panel according to the disclosure.

Referring to FIG. 7, the first organic film 11 may be disposed between the first alignment layer 12 and the first substrate 1. The second organic film 21 may be disposed between the second alignment layer 23 and the second substrate 2. The first organic film 11 and the second organic film 21 may be disposed on both sides of the liquid crystal layer 3 respectively. In order to anchor the liquid crystal molecules 93, the first alignment layer 12 and the second alignment layer 23 may be disposed closer to the liquid crystal layer 3 than the first organic film 11 and the second organic film 21 to the liquid crystal layer 3.

Figure 16:
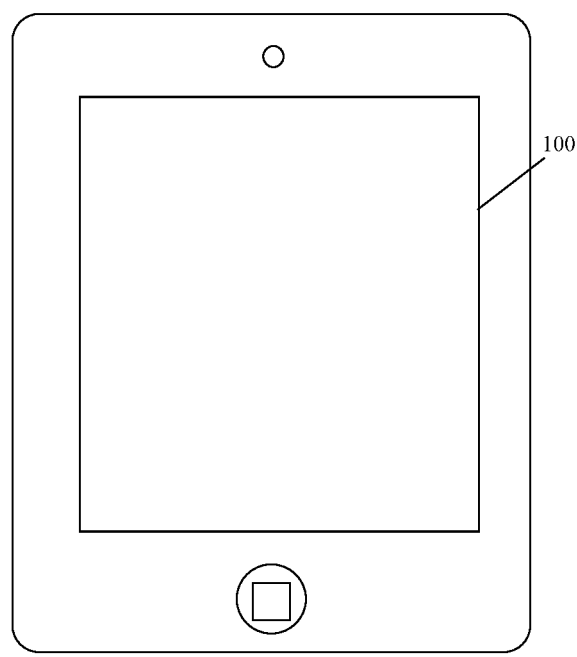
FIG. 16 illustrates a liquid crystal display device containing a liquid crystal display panel according to the disclosed embodiments.

The present disclosure also provides a liquid crystal display device. The liquid crystal display device may include the disclosed LCD panel as shown in FIG. 16. As shown in FIG. 16, the LCD device may include a LCD panel 100 according to the present disclosure. The LCD device may be a smart phone or any other computing device with a LCD panel.

The liquid crystal display device and LCD panel according to the present disclosure may have the dual-domain structure. The liquid crystal molecules in the two domains may compensate each other in optical characteristics to minimize color shift. When observed from different viewing angles, the LCD panel or liquid crystal display device may provide viewers a uniform viewing experience by mitigating the color shift problem to improve the display effect.

Figure 15:
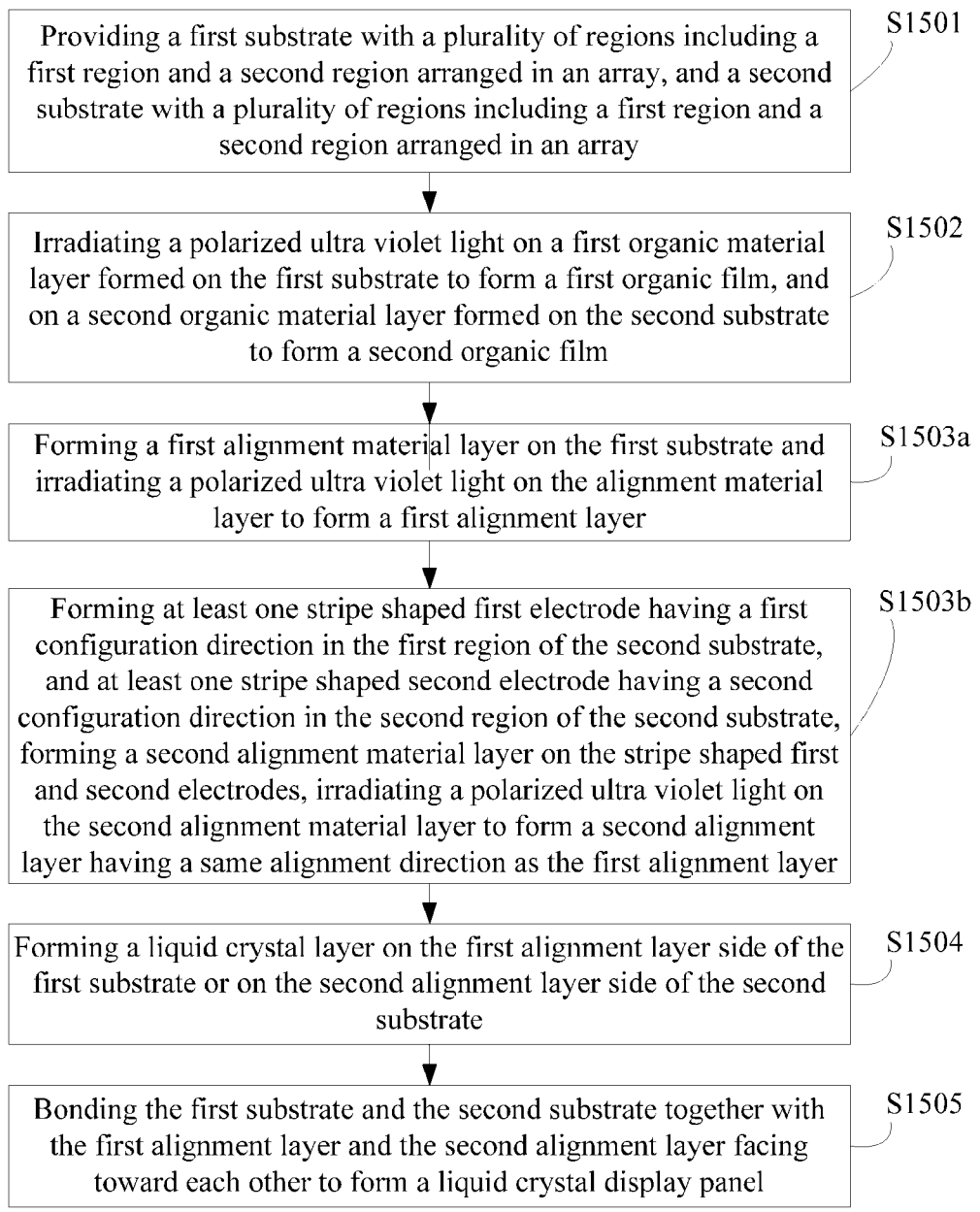
FIG. 15 illustrates a flow chart of an exemplary method of fabricating the liquid crystal display panel according to the disclosed embodiments.

The present disclosure also provides a method of fabricating the disclosed LCD panel. The process of forming the LCD panel structure is illustrated in details with the accompanying drawings. FIG. 15 illustrates a flow chart of an exemplary method of fabricating the liquid crystal display panel according to the present disclosure. Referring to FIG. 15, the method of fabricating the LCD panel according to the present disclosure may include the following steps.

Step S1501: providing a first substrate with a plurality of regions including a first region and a second region arranged in an array, and a second substrate with a plurality of regions including a first region and a second region arranged in an array.

Figure 8A:
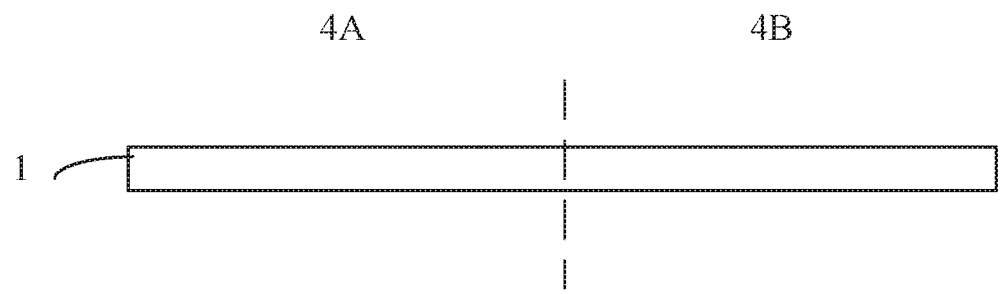
FIG. 8a illustrates a schematic view of an exemplary first substrate according to the disclosed embodiments.

FIG. 8a illustrates a schematic view of an exemplary first substrate according to the present disclosure. Referring to FIG. 8a, a first substrate 1 may be provided. The first substrate 1 may have a plurality of regions arranged in an array. The plurality of the regions may include a first region 4A and a second region 4B.

Figure 8B:
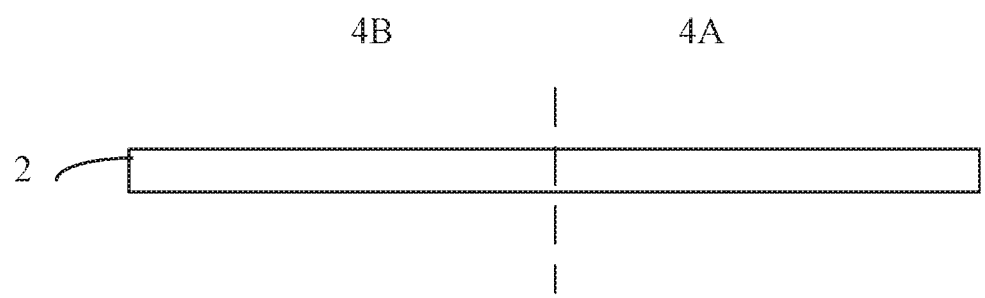
FIG. 8b illustrates a schematic view of an exemplary second substrate according to the disclosed embodiments.

FIG. 8b illustrates a schematic view of an exemplary second substrate according to the present disclosure. Referring to FIG. 8b, a second substrate 2 may be provided. The second substrate 2 may have a plurality of regions arranged in an array. The plurality of the regions may include a first region 4A and a second region 4B.

Step S1502: irradiating a polarized ultra violet light on a first organic material layer formed on the first substrate to form a first organic film, and on a second organic material layer formed on the second substrate to form a second organic film.

Figure 9A:
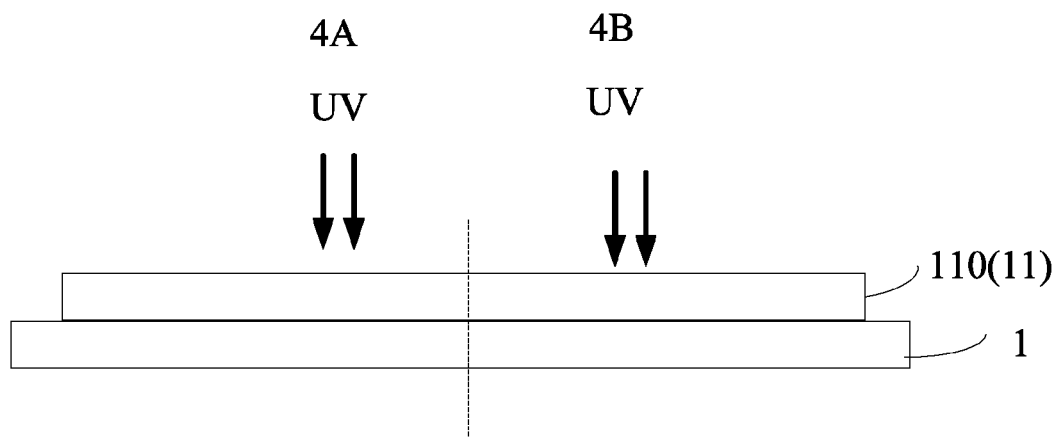
FIG. 9a illustrates a schematic view of forming an exemplary first organic film according to the disclosed embodiments.

FIG. 9a illustrates a schematic view of forming an exemplary first organic film according to the present disclosure. Referring to FIG. 9a, a first organic material layer 110 may be formed on the surface of the first substrate 1. The first organic material layer 110 may include a base material and a dichroic organic dye. The first organic material layer 110 may be irradiated by a polarized ultra violet light to form a first organic film 11 having a first polarization direction.

Figure 9B:
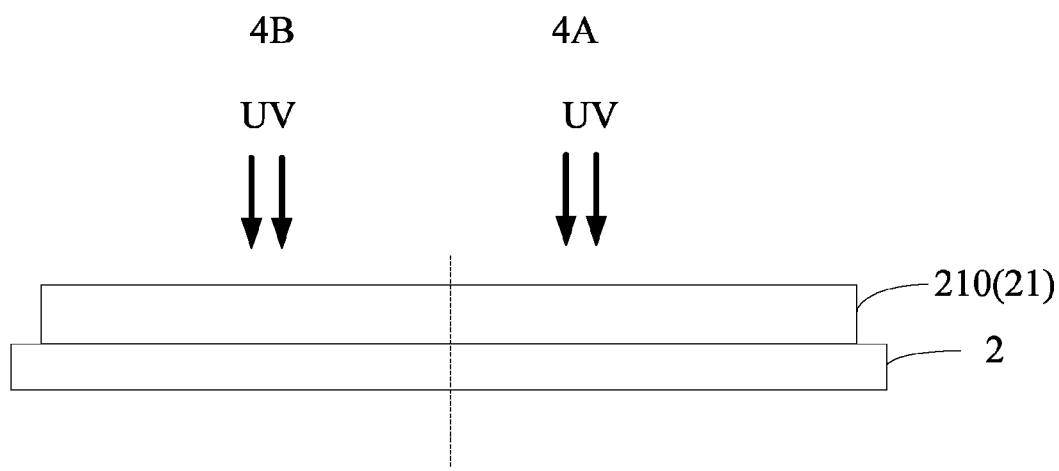
FIG. 9b illustrates a schematic view of forming an exemplary second organic film according to the disclosed embodiments.

FIG. 9b illustrates a schematic view of forming an exemplary second organic film according to the present disclosure. Referring to FIG. 9b, a second organic material layer 210 may be formed on the surface of the second substrate 2. The second organic material layer 210 may include a base material and a dichroic organic dye. The second organic material layer 210 may be irradiated by a polarized ultra violet light to form a second organic film 21 having a second polarization direction. The first polarization direction and the second polarization direction may be perpendicular to each other.

Step S1503a: forming a first alignment material layer on the first substrate and irradiating a polarized ultra violet light on the first alignment material layer to form a first alignment layer.

Figure 10A:
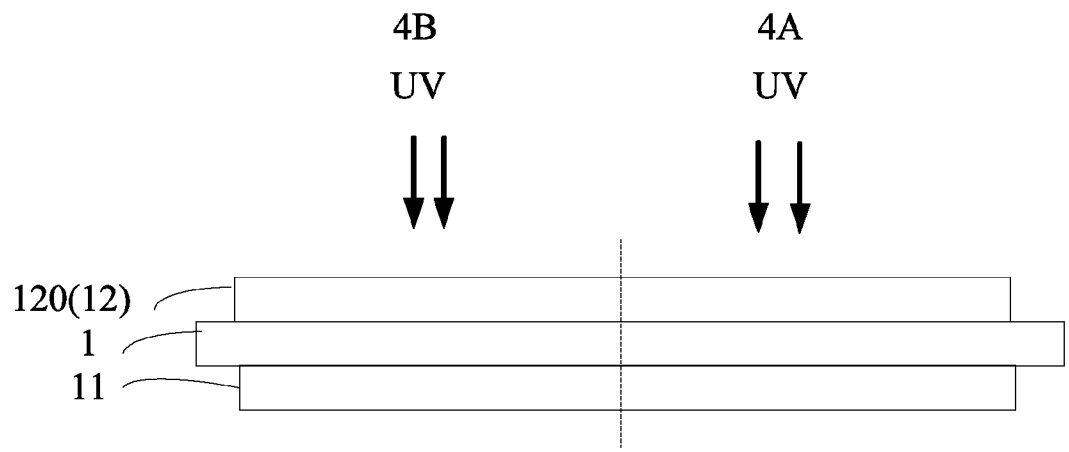
FIG. 10a illustrates a schematic view of forming an exemplary first alignment layer according to the disclosed embodiments.

FIG. 10a illustrates a schematic view of forming an exemplary first alignment layer according to the present disclosure. Referring to FIG. 10a, a first alignment material layer 120 may be formed on the substrate 1. The first alignment material layer 120 may be made of an optical-alignment material. The first alignment material layer 120 may be irradiated by a polarized ultra violet light to form a first alignment layer 12.

Step S1503b: forming at least one stripe-shaped first electrode having a first configuration direction in the first region of the second substrate, and at least one stripe-shaped second electrode having a second configuration direction in the second region of the second substrate, forming a second alignment material layer on the stripe-shaped first and second electrodes, and irradiating a polarized ultra violet light on the second alignment material layer to form a second alignment layer having a same alignment direction as the first alignment layer. In the first region, the alignment direction is a first direction. In the second region, the alignment direction is a second direction. The first alignment material layer and the second alignment material layer are made of optical-alignment material.

Figure 10B:
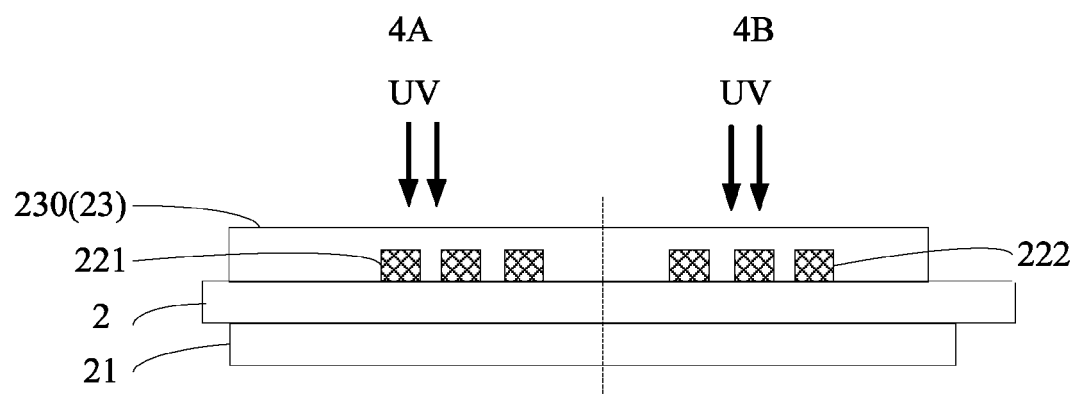
FIG. 10b illustrates a schematic view of forming an exemplary second alignment layer according to the disclosed embodiments.

FIG. 10b illustrates a schematic view of forming an exemplary second alignment layer according to the present disclosure. Referring to FIG. 10b, at least one stripe-shaped first electrode 221 may be formed in the first region 4A of the second substrate 2. The stripe-shaped first electrodes 221 may have a first configuration direction 22a. At least one stripe-shaped second electrode 222 may be formed in the second region 4B of the second substrate 2. The stripe-shaped second electrodes 222 may have a second configuration direction 22b.

A second alignment material layer 230 may be formed on the stripe-shaped first electrodes 221 and the stripe-shaped second electrodes 222. The second alignment material layer 230 may be made of optical-alignment material. The second alignment material layer 230 may be irradiated by a polarized ultra violet light to form a second alignment layer 23. The second alignment layer 23 may have a same alignment direction as the first alignment layer 12. In the first region 4A, the first alignment layer 12 and the second alignment layer 23 may have a first direction 3a as the alignment direction. In the second region 4B, the first alignment layer 12 and the second alignment layer 23 may have a second direction 3b as the alignment direction.

In one embodiment, the first alignment layer 11 and the first organic film 12 may be formed on the different sides of the first substrate 1. Any formation order of the first alignment layer 11 and the first organic film 12 may be used. The second alignment layer 21 and the second organic film 23 may be formed on the different sides of the second substrate 2. Any formation order of the second alignment layer 21 and the second organic film 23 may be used. In other words, any formation order of the steps S1502, S1503a and S1503b may be used though performing the steps S1503a and S1503b together is desired. Step S1502 may be performed prior to Step S1503a and S1503b or vice versa.

Step S1504: forming a liquid crystal layer on the first alignment layer side of the first substrate or on the second alignment layer side of the second substrate.

Step S1505: bonding the first substrate and the second substrate together with the first alignment layer and the second alignment layer facing toward each other to form a liquid crystal display panel.

Figure 11A:
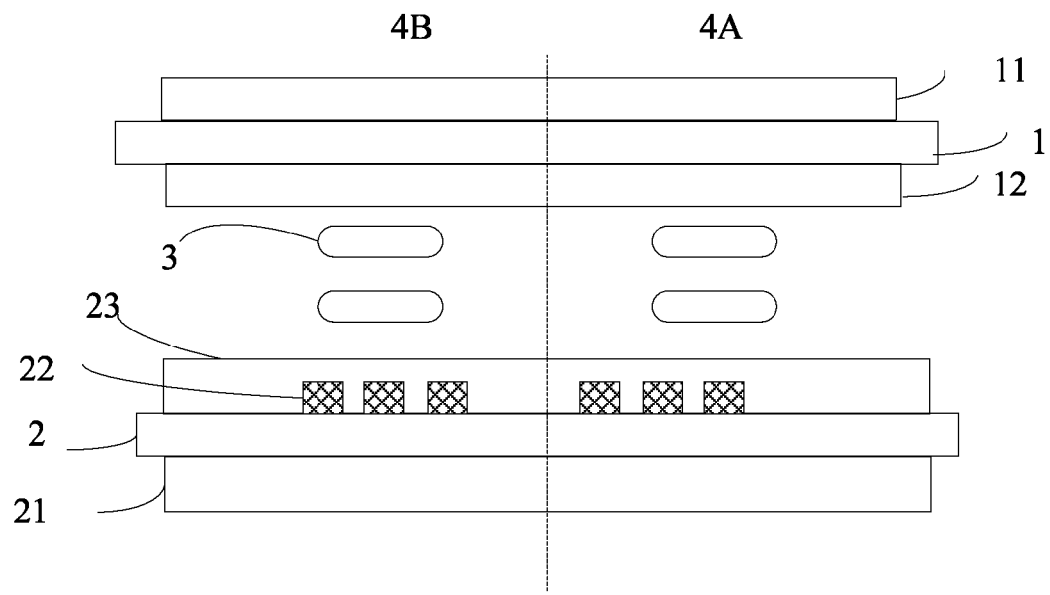
FIG. 11a illustrates a schematic view of an exemplary method of bonding the first substrate and the second substrate with a liquid crystal layer formed in-between according to the disclosed embodiments.

FIG. 11a illustrates a schematic view of an exemplary method of bonding the first substrate and the second substrate with a liquid crystal layer formed in-between according to the present disclosure. Referring to FIG. 11a, a liquid crystal layer 3 may be formed on the second alignment layer 23 side of the second substrate 2. The first substrate 1 and the second substrate 2 may be bonded with the first alignment layer 12 and the second alignment layer 23 facing toward each other.

Figure 11B:
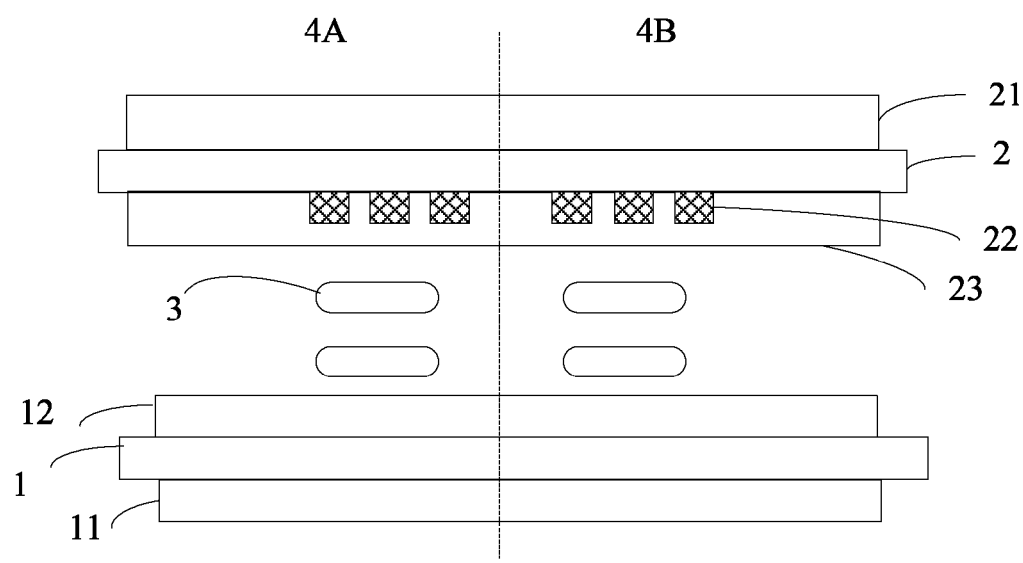
FIG. 11b illustrates a schematic view of another exemplary method of bonding the first substrate and the second substrate with a liquid crystal layer formed in-between according to the disclosed embodiments.

FIG. 11b illustrates a schematic view of another exemplary method of bonding the first substrate and the second substrate with a liquid crystal layer formed in-between according to the present disclosure. Referring to FIG. 11b, a liquid crystal layer 3 may be formed on the first alignment layer 12 side of the first substrate 1. The first substrate 1 and the second substrate 2 may be bonded with the first alignment layer 12 and the second alignment layer 23 facing toward each other.

Returning to FIG. 2, the bonded liquid crystal display panel may form a first angle θ1 between the first configuration direction 22a and the second configuration direction 22b, and a second angle θ2 between the first direction 3a and the second direction 3b. The first angle θ1 may be greater than the second angle θ2.

Alternatively, the first alignment layer 12 and the first organic film 11 may be formed on the same side of the first substrate 1 and the second alignment layer 23 and the second organic film 21 may be formed on the same side of the second substrate 2.

Figure 12A:
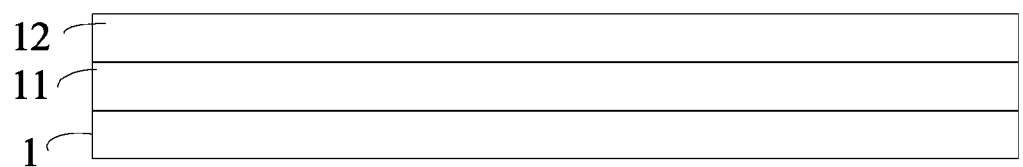
FIG. 12a illustrates a schematic view of forming a first organic film and a first alignment layer on a same side of the first substrate according to the disclosed embodiments.

FIG. 12a illustrates a schematic view of forming a first organic film and a first alignment layer on a same side of the first substrate according to the present disclosure. Referring to FIG. 12a, after a first substrate 1 is provided, a first organic film 11 may be formed on the first substrate 1. A first alignment layer 12 may be formed on the first organic film 11. After the first substrate 1 and the second substrate 2 are bonded together, the first alignment layer 12 may be closer to the liquid crystal layer 3 than the first organic film 11 to the liquid crystal layer 3 to anchor the liquid crystal molecules 93 in an initial alignment direction.

Figure 12B:
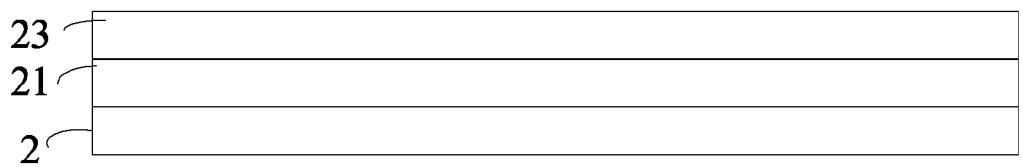
FIG. 12b illustrates a schematic view of forming a second organic film and a second alignment layer on a same side of the second substrate according to the disclosed embodiments.

FIG. 12b illustrates a schematic view of forming a second organic film and a second alignment layer on a same side of the second substrate according to the present disclosure. Referring to FIG. 12b, after a second substrate 2 is provided, a second organic film 21 may be formed on the second substrate 2. A second alignment layer 23 may be formed on the second organic film 21. After the first substrate 1 and the second substrate 2 are bonded together, the second alignment layer 23 may be closer to the liquid crystal layer 3 than the second organic film 21 to the liquid crystal layer 3 to anchor the liquid crystal molecules 93 in an initial alignment direction.

Specifically, the method of irradiating polarized ultra violet light on the first organic material layer to form the first organic film may include the following steps.

At first, a first mask is provided. The first mask exposes the first region of the first organic material layer and shields the second region of the first organic material layer. The first region of the first organic material layer is irradiated by a polarized ultra violet light through the first mask. Further, a second mask is provided. The second mask exposes the second region of the first organic material layer and shields the first region of the first organic material layer. The second region of the first organic material layer is irradiated by a polarized ultra violet light through the second mask. The polarized ultra violet light irradiating the first region has a polarization direction different from the polarization direction of the polarized ultra violet light irradiating the second region.

Figure 13A:
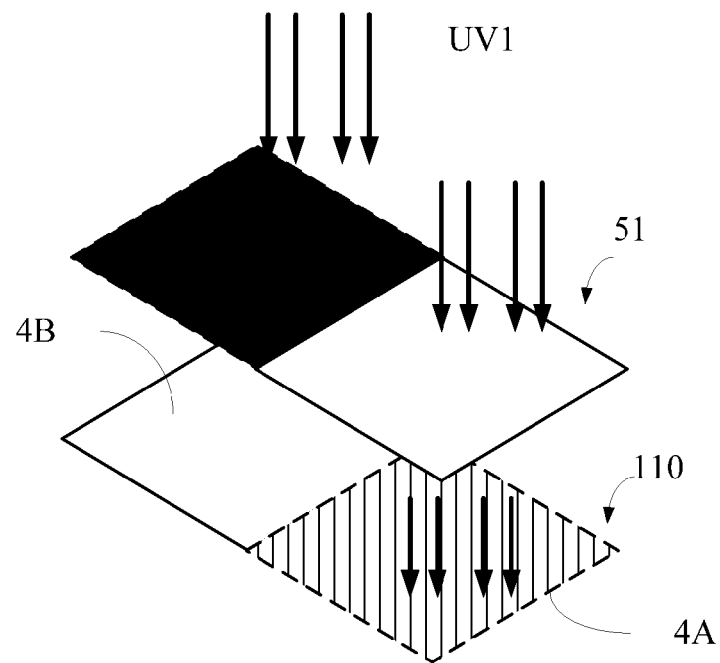
FIG. 13a illustrates a schematic view of forming a first region of an exemplary first organic film according to the disclosed embodiments.

FIG. 13a illustrates a schematic view of forming a first region of an exemplary first organic film according to the present disclosure. Referring to FIG. 13a, a first mask 51 may be provided. The first mask 51 may expose the first region 4A of the first organic material layer 110 and may shield the second region 4B of the first organic material layer 110. The first region 4A of the first organic material layer 110 may be irradiated by a polarized ultra violet light UV1 through the first mask 51. Because the first mask 51 shields the second region 4B of the first organic material layer 110, only the first region 4A of the first organic material layer 110 may receive the polarized ultra violet light UV1. The first organic material layer 110 may include a base material and a dichroic organic dye. The base material may be made of an optical-alignment material or may be made of a non-optical-alignment material. The dichroic organic dye may be made of an optical-alignment material or may be made of a non-optical-alignment material. However, at least one of the base material and the dichroic organic dye may be made of an optical-alignment material.

In one embodiment, the base material may be made of an optical-alignment material and the dichroic organic dye may be made of a non-optical-alignment material. When irradiated by a polarized ultra violet light UV1, the molecules of the base material may be aligned in one direction based on the polarization direction of the polarized ultra violet light. At the same time, the base material may cause the dichroic organic dye to be aligned in a same direction. When the dichroic organic dye is aligned in a same direction, the polarizing organic film may be formed having a polarization direction in the first direction.

In another embodiment, the dichroic organic dye may be made of an optical-alignment material and the base material may be made of a non-optical-alignment material. When irradiated by a polarized ultra violet light UV1, the molecules of the dichroic organic dye may be aligned in one direction based on the polarization direction of the polarized ultra violet light. When the dichroic organic dye is aligned in a same direction, the polarizing organic film may be formed having a polarization direction in the first direction. The base material may simply be a desired film forming material.

Figure 13B:
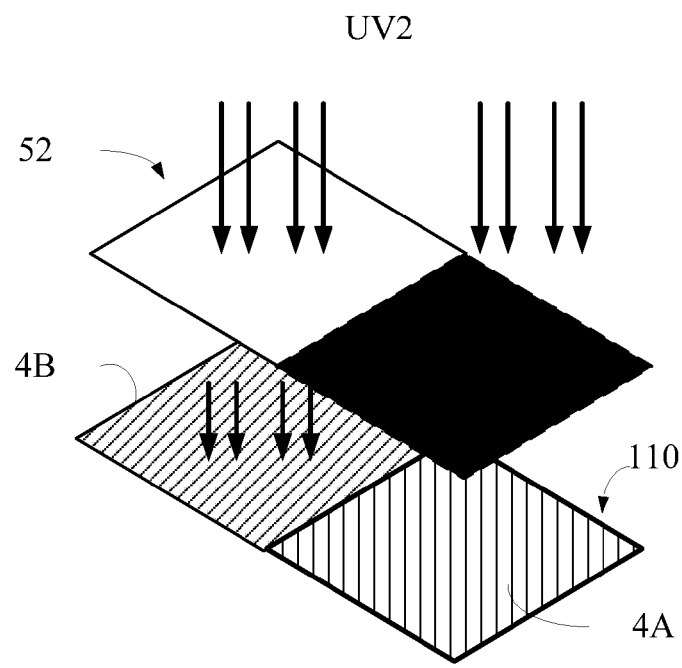
FIG. 13b illustrates a schematic view of forming a second region of an exemplary first organic film according to the disclosed embodiments.

FIG. 13b illustrates a schematic view of forming a second region of an exemplary first organic film according to the present disclosure. Referring to FIG. 13b, a second mask 52 may be provided. The second mask 52 may expose the second region 4B of the first organic material layer 110 and may shield the first region 4A of the first organic material layer 110. The second region 4B of the first organic material layer 110 may be irradiated by a polarized ultra violet light UV2 through the second mask 52. Because the second mask 52 shields the first region 4A of the first organic material layer 110, only the second region 4B of the first organic material layer 110 may receive the polarized ultra violet light UV2.

When irradiated by a polarized ultra violet light UV2, the molecules of the dichroic organic dye in the second region 4B may be aligned in one direction based on the polarization direction of the polarized ultra violet light. When the dichroic organic dye is aligned in a same direction, the polarizing organic film may be formed having a polarization direction in the second direction. The polarized ultra violet light UV1 received in the first region 4A may have the polarization direction different from the polarization direction of the polarized ultra violet light UV2 received in the second region 4B. As a result, the first region 4A may have the polarization direction different from the polarization direction of the second region 4B.

The method of irradiating polarized ultra violet light on the second organic material layer to form a second organic film may be similar to the method of forming the first organic film. Specifically, the method may include the following steps.

At first, a first mask may be provided. The first mask may expose the first region of the second organic material layer and may shield the second region of the second organic material layer. The first region of the second organic material layer may be irradiated by a polarized ultra violet light through the first mask. Further, a second mask may be provided. The second mask may expose the second region of the second organic material layer and may shield the first region of the second organic material layer. The second region of the second organic material layer may be irradiated by a polarized ultra violet light through the second mask. The polarized ultra violet light received in the first region may have a polarization direction different from to the polarization direction of the polarized ultra violet light received in the second region. The second organic film may have a polarization direction in the first region perpendicular to the polarization direction in the first region of the first organic film, and a polarization direction in the second region perpendicular to the polarization direction in the second region of the first organic film.

Specifically, the method of irradiating polarized ultra violet light on the first alignment material layer to form a first alignment layer may include the following steps. At first, a first mask may be provided. The first mask may expose the first region of the first alignment material layer and may shield the second region of the first alignment material layer. The first region of the first alignment material layer may be irradiated by a polarized ultra violet light through the first mask. Further, a second mask may be provided. The second mask may expose the second region of the first alignment material layer and may shield the first region of the first alignment material layer. The second region of the first alignment material layer may be irradiated by a polarized ultra violet light through the second mask. The polarized ultra violet light received in the first region may have a polarization direction different from the polarization direction of the polarized ultra violet light received in the second region.

Figure 14A:
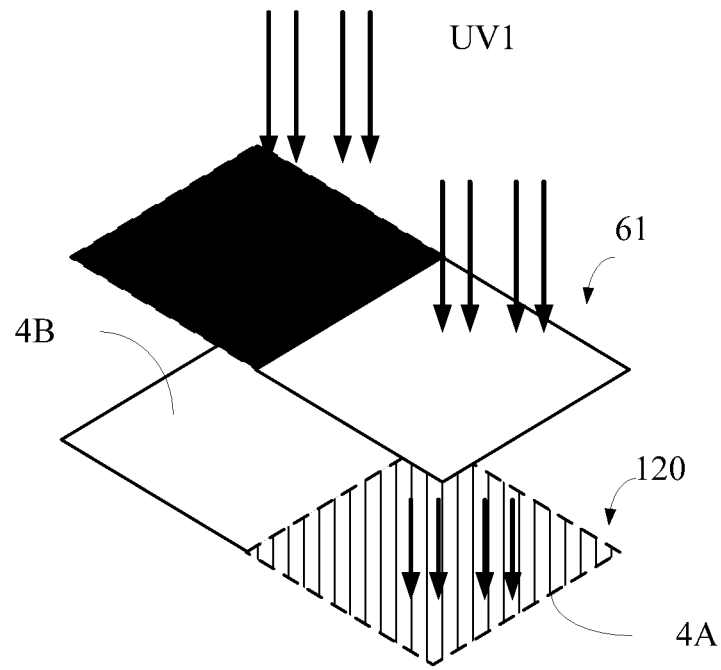
FIG. 14a illustrates a schematic view of forming a first region of an exemplary first alignment layer according to the disclosed embodiments.

FIG. 14a illustrates a schematic view of forming a first region of an exemplary first alignment layer according to the present disclosure. Referring to FIG. 14a, a first mask 61 may be provided. The first mask 61 may expose the first region 4A of the first alignment material layer 120 and may shield the second region 4B of the first alignment material layer 120. The first region 4A of the first alignment material layer 120 may be irradiated by a polarized ultra violet light UV1 through the first mask 61. The first alignment material layer 120 may be made of an optical-alignment material. When irradiated by the polarized ultra violet light UV1, the molecules in the first region 4A of the first alignment material layer 120 may be aligned in one direction based on the polarization direction of the polarized ultra violet light UV1. When the first region 4A of the first alignment material layer 120 is aligned in a same direction, the first region 4A of the first alignment layer 12 may be formed having a first direction as the initial alignment direction in the first region 4A.

Figure 14B:
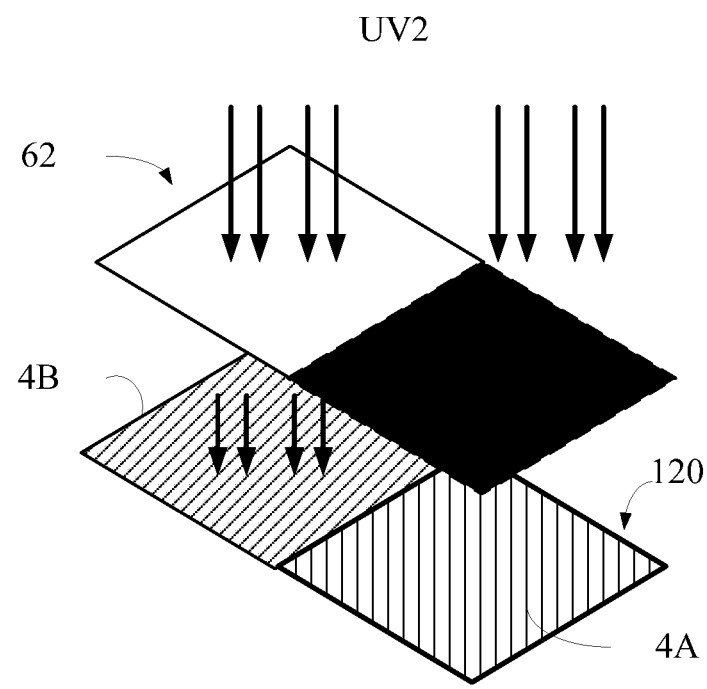
FIG. 14b illustrates a schematic view of forming a second region of an exemplary first alignment layer according to the disclosed embodiments.

FIG. 14b illustrates a schematic view of forming a second region of an exemplary first alignment layer according to the present disclosure. Referring to FIG. 14b, a second mask 62 may be provided. The second mask 62 may expose the second region 4B of the first alignment material layer 120 and may shield the first region 4A of the first alignment material layer 120. The second region 4B of the first alignment material layer 120 may be irradiated by a polarized ultra violet light UV2 through the second mask 62. The first alignment material layer 120 may be made of an optical-alignment material. When irradiated by the polarized ultra violet light UV2, the molecules in the second region 4B of the first alignment material layer 120 may be aligned in one direction based on the polarization direction of the polarized ultra violet light UV2. When the second region 4B of the first alignment material layer 120 is aligned in a same direction, the second region of the first alignment layer 12 may be formed having a second direction as the initial alignment direction in the second region 4B.

The polarized ultra violet light received in the first region 4A may have a polarization direction different from the polarization direction of the polarized ultra violet light received in the second region 4B. Thus, the first direction may be different from the second direction.

The method of irradiating polarized ultra violet light on the second alignment material layer to form a second alignment layer may be similar to the method of forming the first alignment layer. Specifically, the method may include the following steps.

At first, a first mask may be provided. The first mask may expose the first region of the second alignment material layer and may shield the second region of the second alignment material layer. The first region of the second alignment material layer may be irradiated by a polarized ultra violet light the through the first mask. Further, a second mask may be provided. The second mask may expose the second region of the second alignment material layer and may shield the first region of the second alignment material layer. The second region of the second alignment material layer may be irradiated by a polarized ultra violet light through the second mask.

The second alignment material layer may be made of an optical-alignment material. When irradiated by the polarized ultra violet light, the molecules in the second alignment material layer may be aligned in one direction based on the polarization direction of the polarized ultra violet light. When the second alignment material layer is aligned in a same direction, the second alignment layer may be formed having a first direction as the initial alignment direction in the first region and a second direction as the initial alignment direction in the second region.

The polarized ultra violet light received in the first region may have a polarization direction different from the polarization direction of the polarized ultra violet light received in the second region. Thus, the first direction may be different from the second direction.

Accordingly, the LCD panel according to the present disclosure may be a dual-domain structure. The liquid crystal molecules in the two domains may compensate with each other in optical characteristics to minimize color shift. When observed from different viewing angles, the LCD panel or the LCD device according to the present disclosure may have a more uniform visual effect, mitigate the color shift problem, and improve the display effect.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An liquid crystal display (LCD) panel, comprising:
    a first substrate;
    a second substrate arranged opposite to the first substrate;
    a liquid crystal layer disposed between the first substrate and the second substrate;
    a plurality of regions arranged in an array, including at least a first region and a second region adjacent to the first region, wherein the first region includes at least one stripe-shaped first electrode having a first configuration direction and the second region includes at least one stripe-shaped second electrode having a second configuration direction different from the first configuration direction;
    a first organic film formed on the first substrate; and
    a second organic film formed on the second substrate, wherein:
        the first organic film and the second organic film have mutually perpendicular polarization directions;
        in the first region, the first organic film has a polarization direction in a first direction and the second organic film has a polarization direction perpendicular to the first direction; and
        in the second region, the first organic film has a polarization direction in a second direction and the second organic film has a polarization direction perpendicular to the second direction.

2. The liquid crystal display panel of claim 1, further including:
    a first alignment layer formed between the first substrate and the liquid crystal layer; and
    a second alignment layer formed between the second substrate and the liquid crystal layer, wherein:
        the first alignment layer and the second alignment layer have same alignment directions;
        in the first region, the first alignment layer and the second alignment layer have an alignment direction in the first direction; and
        in the second region, the first alignment layer and the second alignment layer have an alignment direction in the second direction.

3. The liquid crystal display panel of claim 2, wherein: the first configuration direction and the second configuration direction form a first angle θ1, the first direction and the second direction form a second angle θ2, and θ1>θ2.

4. The liquid crystal display panel of claim 3, wherein: θ1≤180°; and
θ2>90°.

5. The liquid crystal display panel of claim 2, wherein: liquid crystal molecules in the liquid crystal layer have an initial alignment direction same as the alignment direction of the first alignment layer and the second alignment layer in the first region and in the second region.

6. The liquid crystal display panel of claim 2, further including:
    a pixel electrode and a common electrode formed in a first region, the common electrode being a plane shaped electrode and the pixel electrode being a stripe-shaped first electrode; and
    a pixel electrode and a common electrode formed in a second region, the common electrode being a plane shaped electrode and the pixel electrode being a stripe-shaped second electrode.

7. The liquid crystal display panel of claim 6, wherein:
    a pixel unit includes a first region and a second region; and
    the stripe-shaped first electrode in the first region of the pixel unit and the stripe-shaped second electrode in the second region of the pixel unit are connected together.

8. The liquid crystal display panel of claim 2, further including:
    a pixel electrode and a common electrode formed in a first region, the pixel electrode being a plane shaped electrode and the common electrode being a stripe-shaped first electrode; and
    a pixel electrode and a common electrode formed in a second region, the pixel electrode being a plane shaped electrode and the common electrode being a stripe-shaped second electrode.

9. The liquid crystal display panel of claim 2, wherein:
    the first region is a first pixel unit; and
    the second region is a second pixel unit, wherein the second pixel unit is disposed adjacent to the first pixel unit.

10. The liquid crystal display panel of claim 2, wherein:
    the first organic film and the second organic film include a base material and a dichroic organic dye.

11. The liquid crystal display panel of claim 10, wherein:
    the dichroic organic dye includes one or more of azo dye, anthraquinone dye, biphenyl dye, triphenylmethane diazinon and derivative dye, single methine or methines dye, and polyethylene ring dye.

12. The liquid crystal display panel of claim 2, wherein:
    the first alignment layer and the second alignment layer are made of an optical-alignment material.

13. A liquid crystal display device, comprising a liquid crystal display panel, wherein the liquid crystal display panel comprises:
    a first substrate;
    a second substrate arranged opposite to the first substrate;
    a liquid crystal layer disposed between the first substrate and the second substrate;
    a plurality of regions arranged in an array, including at least a first region and a second region adjacent to the first region, wherein the first region includes at least one stripe-shaped first electrode having a first configuration direction and the second region includes at least one stripe-shaped second electrode having a second configuration direction different from the first configuration direction;
    a first organic film formed on the first substrate; and
    a second organic film formed on the second substrate, wherein:
        the first organic film and the second organic film have mutually perpendicular polarization directions;
        in the first region, the first organic film has a polarization direction in a first direction and the second organic film has a polarization direction perpendicular to the first direction; and in the second region, the first organic film has a polarization direction in a second direction and the second organic film has a polarization direction perpendicular to the second direction.

14. A method of fabricating a liquid crystal display panel comprising a first substrate; a second substrate arranged opposite to the first substrate; a liquid crystal layer disposed between the first substrate and the second substrate; a plurality of regions arranged in an array, including at least a first region and a second region adjacent to the first region, wherein the first region includes at least one stripe-shaped first electrode having a first configuration direction and the second region includes at least one stripe-shaped second electrode having a second configuration direction different from the first configuration direction; a first organic film formed on the first substrate; and a second organic film formed on the second substrate, wherein: the first organic film and the second organic film have mutually perpendicular polarization directions; in the first region, the first organic film has a polarization direction in a first direction and the second organic film has a polarization direction perpendicular to the first direction; and in the second region, the first organic film has a polarization direction in a second direction and the second organic film has a polarization direction perpendicular to the second direction, wherein the method comprises:
  providing a first substrate;
  providing a second substrate arranged opposite to the first substrate;
  forming a plurality of regions arranged in an array including at least a first region and a second region adjacent to the first region on the first and second substrates;
  forming a first organic film on the first substrate;
  forming a second organic film on the second substrate;
  forming a first alignment layer on the first substrate;
  forming at least one stripe-shaped first electrode in the first region of the second substrate and at least one stripe-shaped second electrode in the second region of the second substrate;
  forming a second alignment layer on the stripe-shaped first and second electrodes;
  forming a liquid crystal layer on the first alignment layer side of the first substrate or on the second alignment layer side of the second substrate; and
  bonding the first substrate and the second substrate together with the first alignment layer and the second alignment layer facing toward each other to form a liquid crystal display panel.

15. The fabrication method of claim 14, wherein:
the first organic film and the second organic film have mutually perpendicular polarization directions;
the first alignment layer and the second alignment layer have same alignment directions;
in the first region, the stripe-shaped first electrode has a first configuration direction, the first organic film has a polarization direction in a first direction, the second organic film has a polarization direction perpendicular to the first direction, and the first alignment layer and the second alignment layer have an alignment direction in the first direction;
in the second region, the stripe-shaped second electrode has a second configuration direction different from the first configuration direction, the first organic film has a polarization direction in a second direction, the second organic film has a polarization direction perpendicular to the second direction, the first alignment layer and the second alignment layer have an alignment direction in the second direction;
the first configuration direction and the second configuration direction form a first angle $\theta 1$, the first direction and the second direction form a second angle $\theta 2$, and $\theta 1 > \theta 2$; and
$\theta 1 \leq 180°$ and $\theta 2 > 90°$.

16. The fabrication method of claim 15, wherein:
the first alignment layer is formed by:
  providing a first mask to expose the first region of the first alignment material layer and to shield the second region of the first alignment material layer;
  irradiating a polarized ultra violet light on the first region of the first alignment material layer through the first mask;
  providing a second mask to expose the second region of the first alignment material layer and to shield the first region of the first alignment material layer; and
  irradiating a polarized ultra violet light on the second region of the first alignment material layer through the second mask, wherein the polarized ultra violet light received in the first region has a polarization direction different from the polarization direction of the polarized ultra violet light received in the second region; and
the second alignment layer is formed by:
  providing a first mask to expose the first region of the second alignment material layer and to shield the second region of the second alignment material layer;
  irradiating a polarized ultra violet light on the first region of the second alignment material layer through the first mask;
  providing a second mask to expose the second region of the second alignment material layer and to shield the first region of the second alignment material layer; and
  irradiating a polarized ultra violet light on the second region of the second alignment material layer through the second mask, wherein the polarized ultra violet light received in the first region has a polarization direction different from the polarization direction of the polarized ultra violet light received in the second region.

17. The fabrication method of claim 15, wherein:
the first organic film is formed by:
  providing a first mask to expose the first region of the first organic material layer and to shield the second region of the first organic material layer;
  irradiating a polarized ultra violet light on the first region of the first organic material layer through the first mask;
  providing a second mask to expose the second region of the first organic material layer and to shield the first region of the first organic material layer; and
  irradiating a polarized ultra violet light on the second region of the first organic material layer through the second mask, wherein the polarized ultra violet light received in the first region has a polarization direction perpendicular to the polarization direction of the polarized ultra violet light received in the second region; and
the second organic film is formed by:
  providing a first mask to expose the first region of the second organic material layer and to shield the second region of the second organic material layer;

irradiating a polarized ultra violet light on the first region of the second organic material layer through the first mask;
providing a second mask to expose the second region of the second organic material layer and to shield the first region of the second organic material layer; and
irradiating a polarized ultra violet light on the second region of the second organic material layer through the second mask, wherein the polarized ultra violet light received in the first region has a polarization direction perpendicular to the polarization direction of the polarized ultra violet light received in the second region.

18. The fabrication method of claim 15, wherein:
the first organic film is formed on a side of the first substrate away from the liquid crystal layer; and
the second organic film is formed on a side of the second substrate away from the liquid crystal layer.

19. fabrication method of claim 15, wherein:
the first organic film is formed between the first alignment layer and the first substrate; and
the second organic film is formed between the second alignment layer and the second substrate.

* * * * *